US011601638B2

(12) United States Patent
Ratcliff et al.

(10) Patent No.: US 11,601,638 B2
(45) Date of Patent: Mar. 7, 2023

(54) HEAD-MOUNTED DISPLAY DEVICE

(71) Applicant: INTEL CORPORATION, Santa Clara, CA (US)

(72) Inventors: Joshua J. Ratcliff, San Jose, CA (US); Alexey M. Supikov, San Jose, CA (US); Seth E. Hunter, Santa Clara, CA (US); Santiago E. Alfaro, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 728 days.

(21) Appl. No.: 15/402,866

(22) Filed: Jan. 10, 2017

(65) Prior Publication Data

US 2018/0199028 A1 Jul. 12, 2018

(51) Int. Cl.
| | |
|---|---|
| *G02B 27/01* | (2006.01) |
| *H04N 13/344* | (2018.01) |
| *H04N 19/122* | (2014.01) |
| *H04N 19/14* | (2014.01) |
| *H04N 19/18* | (2014.01) |
| *H04N 19/44* | (2014.01) |

(52) U.S. Cl.
CPC ....... *H04N 13/344* (2018.05); *G02B 27/0172* (2013.01); *H04N 19/122* (2014.11); *H04N 19/14* (2014.11); *H04N 19/18* (2014.11); *H04N 19/44* (2014.11); *G02B 2027/0134* (2013.01)

(58) Field of Classification Search
CPC . H04N 13/044; G02B 27/0172; G06T 19/006
See application file for complete search history.

(56) References Cited

U.S. PATENT DOCUMENTS

| | | | | |
|---|---|---|---|---|
| 4,851,870 | A * | 7/1989 | Tanaka | G03B 9/14 396/235 |
| 8,836,784 | B2 * | 9/2014 | Erhardt | G07C 5/008 348/148 |
| 8,902,321 | B2 | 12/2014 | Venkataraman et al. | |
| 9,497,445 | B2 * | 11/2016 | Moller | H04N 13/315 |
| 9,577,794 | B2 * | 2/2017 | Horiguchi | H04N 13/341 |

(Continued)

OTHER PUBLICATIONS

U.S. Appl. No. 15/391,919, filed Dec. 28, 2016, Seth E. Hunter.

(Continued)

*Primary Examiner* — Shawn S An
(74) *Attorney, Agent, or Firm* — Hanley, Flight & Zimmerman LLC

(57) ABSTRACT

In one example, a head-mounted display (HMD) device includes multiple display panels arranged in parallel with each other. Each of the display panels is associated with one of multiple focal lengths. The HMD device includes multiple lenses to view a three-dimensional (3D) scene on the display panels. The HMD device also includes a controller to provide a frame of the 3D scene, viewable at the focal lengths. The frames include focal layers generated at one of the focal lengths. The frames are rendered by displaying the focal layers in a sequence on the display panels associated with the focal length at which the focal layer is generated. The controller also allows visible light to pass through one or more of the display panels based on whether the render planes are between an active focal layer and the lenses.

29 Claims, 7 Drawing Sheets

(56) References Cited

U.S. PATENT DOCUMENTS

| | | | |
|---|---|---|---|
| 2002/0113753 A1* | 8/2002 | Sullivan | G02F 1/13718 349/5 |
| 2002/0163482 A1* | 11/2002 | Sullivan | G06T 15/00 345/6 |
| 2005/0264867 A1* | 12/2005 | Cho | G02B 5/09 359/291 |
| 2006/0001954 A1* | 1/2006 | Wahl | G02B 21/086 359/368 |
| 2006/0077545 A1 | 4/2006 | Cobb et al. | |
| 2006/0158455 A1 | 7/2006 | Yoshino | |
| 2007/0097277 A1* | 5/2007 | Hong | G02B 3/14 349/11 |
| 2008/0266655 A1* | 10/2008 | Levoy | G02B 21/367 359/368 |
| 2009/0051759 A1* | 2/2009 | Adkins | H04N 13/341 348/54 |
| 2010/0238664 A1* | 9/2010 | Steenbergen | G02F 1/133308 362/276 |
| 2011/0075257 A1* | 3/2011 | Hua | H04N 13/383 359/464 |
| 2011/0157483 A1* | 6/2011 | Reichow | H04N 9/3161 348/740 |
| 2012/0044493 A1* | 2/2012 | Smart | G01N 15/1434 356/336 |
| 2012/0313839 A1 | 12/2012 | Smithwick et al. | |
| 2013/0182756 A1* | 7/2013 | Furlan | H04N 19/46 375/E7.164 |
| 2014/0055449 A1* | 2/2014 | O'Dor | G09G 5/377 345/419 |
| 2014/0063077 A1 | 3/2014 | Wetzstein et al. | |
| 2014/0204176 A1 | 7/2014 | Boisson et al. | |
| 2014/0267941 A1* | 9/2014 | Ellsworth | G02B 27/0172 349/5 |
| 2015/0055884 A1 | 2/2015 | Venkataraman et al. | |
| 2015/0124221 A1* | 5/2015 | Horiguchi | H04N 13/324 353/7 |
| 2015/0363978 A1 | 12/2015 | Maimone et al. | |
| 2016/0026253 A1* | 1/2016 | Bradski | H04N 13/128 345/8 |
| 2016/0161744 A1* | 6/2016 | Kobayashi | G02B 27/0179 345/8 |
| 2016/0284121 A1 | 9/2016 | Azuma | |
| 2017/0045746 A1* | 2/2017 | Ellsworth | G02C 9/02 |
| 2018/0091804 A1 | 3/2018 | Hunter | |
| 2018/0092698 A1* | 4/2018 | Chopra | G06F 3/011 |
| 2018/0184066 A1 | 6/2018 | Salahieh et al. | |
| 2018/0184074 A1 | 6/2018 | Hunter et al. | |
| 2019/0041634 A1* | 2/2019 | Popovich | G02B 6/00 |
| 2019/0260982 A1* | 8/2019 | Hua | G02B 17/086 |

OTHER PUBLICATIONS

Cao, Xuan, Zheng Geng, Tuotuo Li, Mei Zhang, and Zhaoxing Zhang "Accelerating decomposition of light field video for compressive multi-layer display." Optics express 23, No. 26 (2015): 34007-34022. (Year: 2015).

Chen, Yong-Sheng, Chan-Hung Su, Jiun-Hung Chen, Chu-Song Chen, Yi-Ping Hung, and Chiou-Shann Fuh. "Video-based eye tracking autostereoscopic displays." Optical Engineering 40, No. 12 (2001): 2726-2735. (Year: 2001).

Pamplona, Vitor F., Manuel M. Oliveira, Daniel G. Aliaga, and Ramesh Raskar. "Tailored displays to compensate for visual aberrations." (2012). (Year: 2012).

U.S. Appl. No. 61/707,691 entitled "Synthesizing Images From Light Fields Utilizing Virtual Viewpoints" by NISENZON, Semyon, and JAIN, Ankit filed Sep. 28, 2012.

* cited by examiner

600

HEAD-MOUNTED DISPLAY DEVICE

BACKGROUND

A head-mounted device (HMD) is a device that attaches to the head, and provides the viewer virtual or augmented reality experiences, for example. These experiences may use three-dimensional (3D) images to help the viewer feel immersed in the visual experience being presented. Many HMD devices present their images in accordance with how the eye perceives light at various distances. For example, when using an HMD device for virtual reality applications, 3D images of objects appear as though they are being seen at a certain distance from the viewer. Like a camera focusing on the subject of a photograph, the eyes focus on objects in their field of view at their respective distances. These distances are referred to as their focal length. Thus, when the eyes focus at a certain focal length, objects at that distance come into focus, and objects at other distances appear to blur, in a phenomenon called retinal blur. Accordingly, HMD devices attempt to display 3D images that make their displayed objects appear at their respective focal lengths, and the objects at different focal lengths appear to blur.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
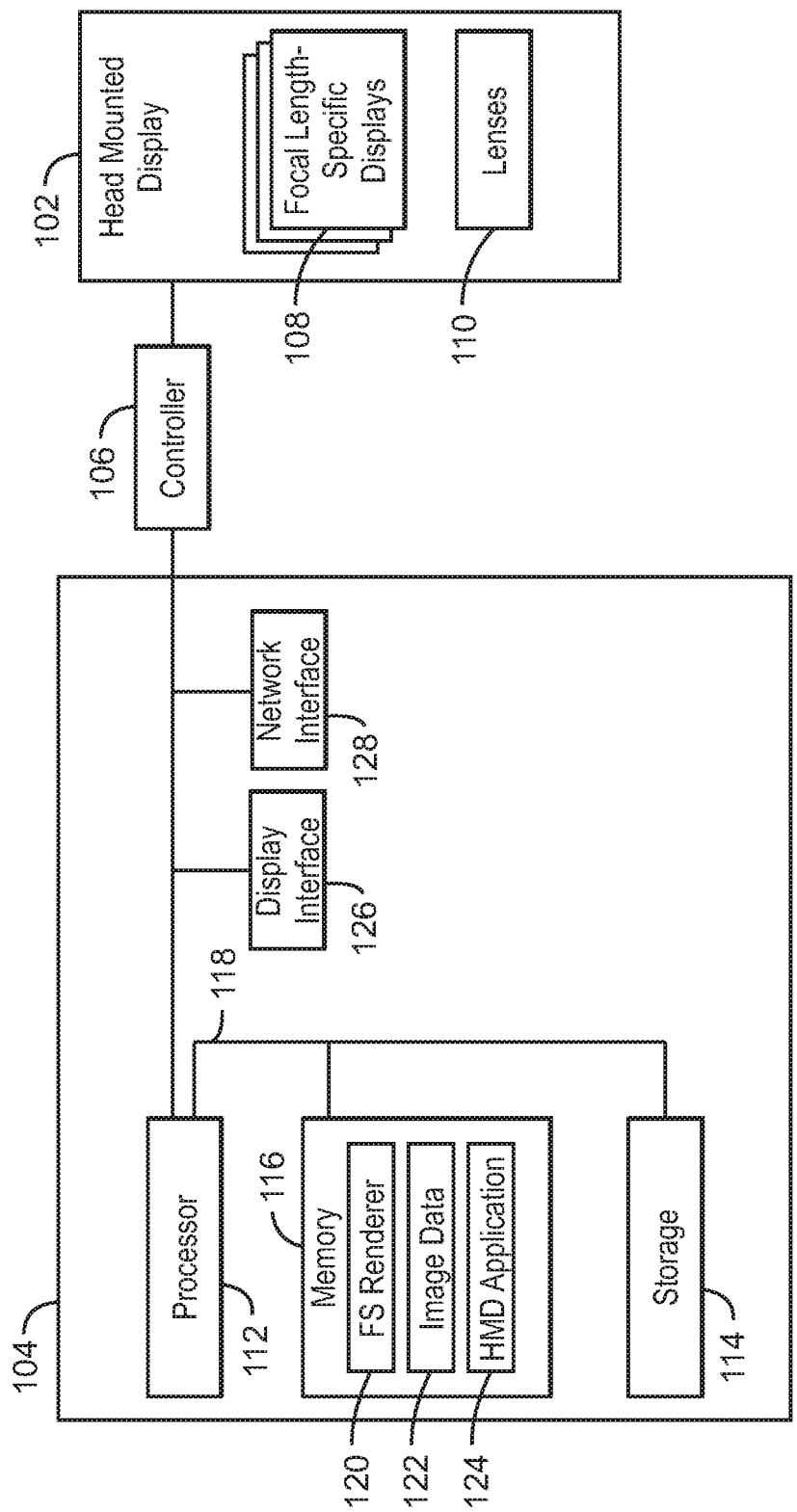
FIG. 1 illustrates an example system for a head-mounted display (HMD) device.

HMD devices can display 3D images by presenting two stereo images, one before each eye. A stereo image is a pair of eye-specific images, one generated for, and displayed at the same time in view of, each eye. Being eye-specific means the image represents some scene, for example, from the perspective of the specific eye before which the image is presented, i.e., right or left. Each stereo image appears two-dimensional (2D) when viewed alone. However, displaying the stereo images at the same time, one before each eye, gives the appearance of depth, creating a three-dimensional image in the eyes' view.

The 3D images may be of any objects, scenes, environments, scenarios, and so on, that a gaming, virtual reality, or augmented reality application may provide, for example. Thus, to distinguish individual stereo images from the 3D images in which they appear, the 3D image referenced in some embodiments is referred to as a 3D scene. A 3D scene may be static or dynamic, i.e., remaining the same, as in a single image; or, changing, as in a video showing activity or movement. Whether a 3D scene appears static or dynamic, 3D scenes are actually displayed in a succession of static images, referred to as frames, whereas one frame appears before each eye.

The frequency with which each successive frame is displayed has an effect on how the images are perceived. For example, moving images displayed at frame rates below what is known as the human flicker threshold, appear to, as the name suggests, flicker. The frame rate for film, for example, can be 24 frames per second. This means that a new frame is displayed every ¹⁄₂₄th of a second. Frame rates are typically discussed in terms of hertz (Hz), which represents one cycle per second. Thus, if the display of a frame represents one cycle, then a display device with a frame rate of 50 Hz displays 50 frames per second. The frame rates for HMDs may vary from device to device, and tend to be represented as a base rate, or some multiple thereof. The base rate represents a standard above the human flicker threshold. Thus, by doubling, tripling, etc., the lower rate, it is possible to display moving images without flicker. For example, some HMD devices can have frame rates of 60 Hz, 120 Hz, 180 Hz, and 240 Hz. Other frame rates are also available. However, whatever the base frame rate is, the human flicker threshold may be maintained with the base frame rate multiplied by two, three, four, etc.

Some embodiments include a synchronized, multi-focal length HMD device that can display realistic, quality 3D images, in a way that is visually comfortable. These visually comfortable images can be useful for 3D viewing in short-running and long-running, virtual and augmented reality applications. Being multi-focal length means that the 3D scenes displayed can be comfortably perceived at any one of multiple focal lengths. These features may be provided by combining, controlling, and synchronizing: multi-focal image rendering, eye tracking, and the single frame display of a 3D scene in multiple layers, where each layer represents the 3D scene at a different focal length than the others. The focal layer is an eye-specific, focal length-specific stereo image of a 3D scene. Some embodiments can display 3D scenes by displaying a set of focal layers before each eye within one frame of a 3D scene. The set of focal layers for one frame is referred to herein as a focal stack. Displaying 3D scenes using focal stacks with multiple focal lengths enables the viewer to view the 3D scene from any one of multiple focal lengths, which provides quality and realistic 3D images across the perceivable range of frame rates used in various HMD devices. In comparison to current virtual reality displays, 3D scenes appear more realistic when light rays from different focal planes fall on your retina as your eye accommodates, at close or long ranges. These rays converge or focus depending on the diameter of the eye lens. As a result, more realistic light field renderings are possible on a multi-focal display—as well as some parallax cues. The focal layer on which the viewer's eyes are focused appears in focus and the others focal layers may be perceived as retinal blur.

FIG. 1 is a block diagram of an example system 100 for an HMD device 102. The example system 100 includes the HMD device 102, a computing device 104, and a controller 106. In some embodiments, the HMD device 102 and the computing device 104 are integrated. For example, the HMD device 102 may include an example computing device 104, such as a system on a chip (SoC). Additionally, the computing device 104 may be any computing resource such as, for example, a desktop computer, laptop, tablet, smartphone, gaming console, and the like. The HMD device 102 includes multiple focal length-specific displays 108 and lenses 110. The focal length-specific displays 108 provide surfaces on which focal layers for specific focal lengths are viewed. In some embodiments, the focal length-specific displays 108 are arranged one behind the other to display all of the focal layers. In this manner, the combined view of the focal layers in one frame appears to be a single image. Additionally, the focal length-specific displays 108 may be electrically switchable between a display mode, where a focal layer of appropriate focal length is displayed, and a transparent mode, where the focal length-specific display 108 allows light to pass through to one of the focal length-specific displays 108 that is displaying a current focal layer. In some embodiments, the focal length-specific displays 108 may include the combination of projector modules projecting focal layers on scatter shutters. Scatter shutters may be electrically switchable projection surfaces, and are described in greater detail with respect to FIG. 4. Alternatively, the focal length-specific displays 108 may include transparent display devices, such as transparent organic, and inorganic, light-emitting diode displays.

The lenses 110 may provide a focused view of the focal layers on the focal length-specific displays 108. The focal length-specific displays 108 are at slightly different distances from the lenses 110, so to a viewer looking through the lens 110 the optical images of the displays appear at different distances (usually way greater than physical distances between displays and lenses) as dictated by the lens equation. In some embodiments, the lenses 110 are electrically switchable between a focusing state and a transparent state. Using electrically switchable lenses as lenses 110 may be useful for augmented reality applications, where the real world view is combined into the same frame as the focal stack. Because the focal length of the lenses 110 is for focusing on the focal length-specific displays 108, the real world view may appear out of focus when presented to the viewer. Accordingly, the lenses 110 may be electrically switched to a transparent state in order to allow the viewer to focus their eyes on the real world view.

The example computing device 104 includes a processor 112, storage 114, and a memory 116 such as a random access memory (RAM). Processor 112, storage 114, and memory 116 can be in communication with each other via a bus 118 (for example, PCI®, PCI-Express®, NuBus, etc.) The example computing device 104 may be, for example, a mobile phone, laptop, tablet, phablet, wearable device, and the like, and/or any type of computing device. The storage 114 may include a hard drive, an optical drive, a USB flash drive, an array of drives, or any combinations thereof. The processor 112 executes stored instructions, and can be a single core processor, a multi-core processor, a computing cluster, or any number of other configurations of computer processing units. The memory 116 stores instructions that are executable by the processor 112. The memory 116 can be one or more of RAM, dynamic random access memory (DRAM), static random access memory (SRAM), flash memory, or any other suitable type of volatile and/or non-volatile memory and/or memory system.

The memory 116 may include a focal stack (FS) renderer 120, image data 122, and an HMD application 124. The image data 122 may describe a 3D scene, and may be rendered by the HMD application 124. In some embodiments, the image data 122 may be generated by processing light field data, and from re-processing stereo 3D movies or images. Light field data represents the flow of light through various points in contiguous space, and is typically described in terms of rays, specifically in terms of an angular component and radiance. Knowing the disparity between light rays makes it possible to determine depth, and calculate parallax and focus cues. Parallax refers to a visual effect where the appearance of the position, or direction, of an object changes when the viewing angle, with respect to the viewer and the object, changes. Re-processing 3D images may involve one more optical techniques for manipulating the appearance of images, such as, for example, calculating a depth map for the 3D image, and/or slicing the 3D scene into multiple focal layers. Slicing the 3D scene in this way makes it possible to create multiple focal layers for the 3D scene. The focal stack renderer 120 renders focal stacks of 3D scenes based on the image data 122 and requests from controller 106.

Referring back to FIG. 2, the colors of the individual pixels of the focal stack may be distributed among multiple focal layers, so the color that appears to the viewer is blended across the focal stack. In other words, each pixel is a different color in each focal layer, making a different contribution to the color perceived by the viewer. Accordingly, this pixel color distribution may be depth-weighted, or generated using a more complex and higher quality focal stack, or even a light field data. Being depth-weighted means that the contribution of each individual pixel at each focal layer is weighted based on the depth of the pixel.

The HMD application 124 may be any application that generates image data 122 to be displayed three-dimensionally. The HMD application 124 may include, for example, a virtual reality (VR) application and/or an augmented reality (AR) application. The HMD application 124 may make a call to the controller 106 to display a 3D image on the HMD device 102 using the image provided in the image data 122. This is accomplished with a bus command over a display interface 126. In some embodiments, the display interface 126 is linked to the processor 112 through the bus 118 (e.g., PCI®, PCI-Express®, NuBus, etc.) and/or through an interconnect that connects the computing device 104 to the controller 106.

The display interface 126 provides a communication link for bus commands and image data, and can include any suitable graphics processing unit (GPU), transmitter, port, physical interconnect, and the like. In some examples, the display interface 126 can implement any suitable protocol for transmitting data to the display device. For example, the display interface 126 can transmit data using a high-definition multimedia interface (HDMI) protocol, a DisplayPort (DP) protocol, and the like. The display interface 126 can transmit data to the controller 106, or any other suitable sink device, at a predetermined maximum data rate via a high-definition multimedia interface (HDMI) link, via a DisplayPort (DP) link, or any other suitable link and/or protocol. In addition, a network interface 128 may be adapted to connect the computing device 104 and the controller 106 via bus 118 and/or an interconnect through a network (the network is not shown). The network may be a cellular network, a radio network, a wide area network (WAN), a local area network (LAN), or the Internet, among others, or a combination thereof.

The controller 106 combines, controls, and synchronizes the generation of focal stacks, eye tracking, and the displaying of 3D scenes on the HMD device 102 using the focal stacks generated by the focal stack renderer 110. In response to a request from the HMD application 124, the controller 106 requests focal length-specific, and eye-specific focal stacks, one frame at a time, from the focal stack renderer 110. In response, the focal stack renderer 110 generates the focal stacks, and provides them to the controller 106 for display on the HMD device 102.

It is to be understood that the block diagram of FIG. 1 is not intended to indicate that the computing device 104 is to include all of the components shown in FIG. 1. Rather, the computing device 104 can include fewer or additional components not illustrated in FIG. 1 (e.g., additional memory components, embedded controllers, additional modules, additional network interfaces, etc.). Furthermore, any of the functionalities of the computing device 104 may be partially, or entirely, implemented in hardware and/or in the processor 112. For example, functionality may be implemented with an application specific integrated circuit, logic implemented in an embedded controller, logic implemented in the processor 112, software (e.g., an application, among others), firmware, or any suitable combination of hardware, software, and/or firmware.

Figure 2:
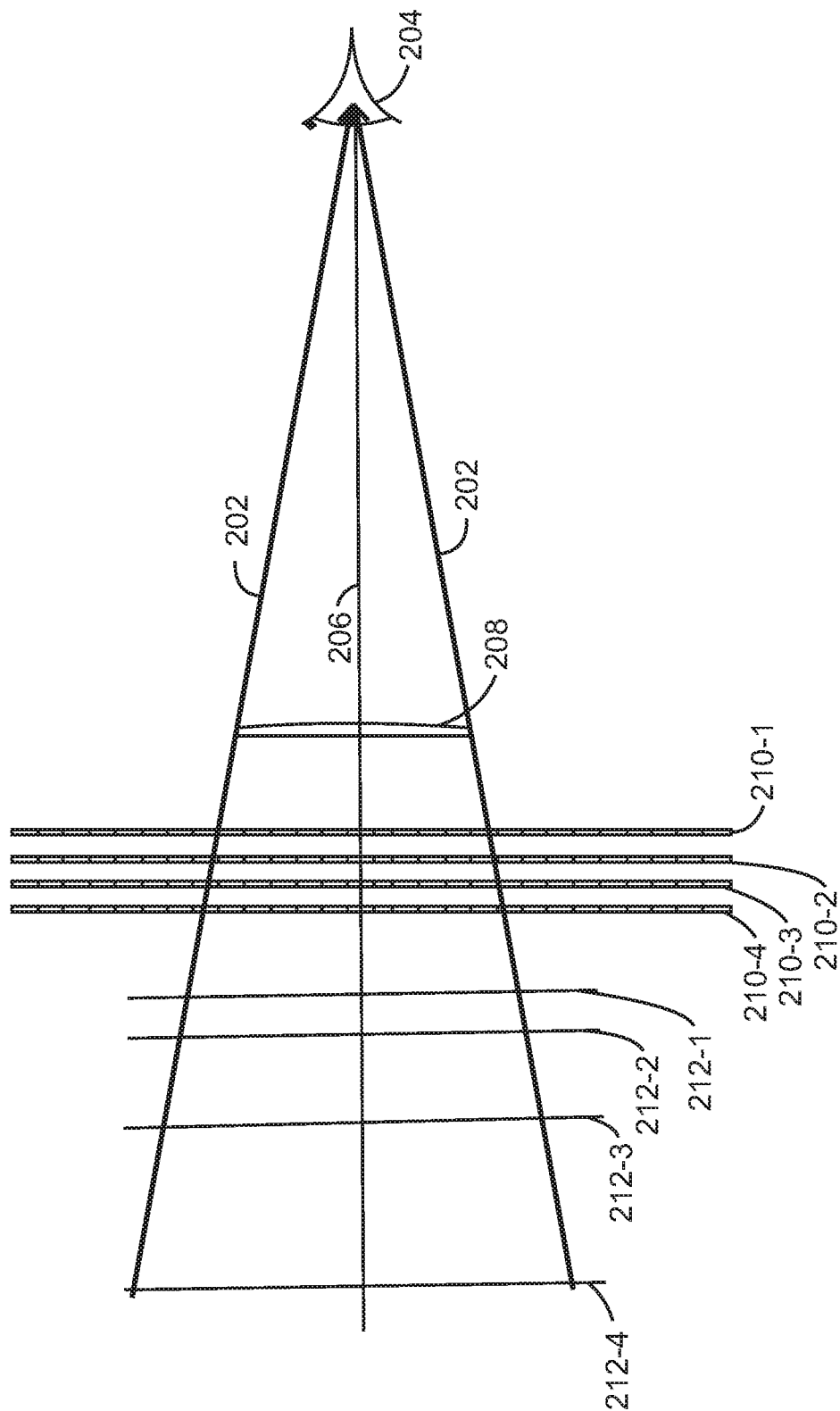
FIG. 2 illustrates an example eye box for a multi-plane (-focal) HMD device with a single lens per eye.

FIG. 2 illustrates an example eye box for an HMD device. The field of view 202 is the area between the lines within which the eye 204 perceives light. The line of sight 206 is an imaginary line that travels from the center of the pupil, through a lens 208, to four scatter shutters 210 (including scatter shutter 210-1, scatter shutter 210-2, scatter shutter 210-3, and scatter shutter 210-4), and their respective perceived focal lengths 212 (including perceived focal length 212-1, perceived focal length 212-2, perceived focal length 212-3, and perceived focal length 212-4). As stated previously, each scatter shutter 210 displays the image for a specific corresponding perceived focal length 212. Thus, in this example, the scatter shutter 210-1 displays images that appear to be at focal length 212-1. Similarly, scatter shutters 210-2, 210-3, and 210-4 display images that appear to be at focal lengths 212-2, 212-3, and 212-4, respectively. In one embodiment, the perceived focal lengths 212 are one foot (perceived focal length 212-1), three feet (perceived focal length 212-2), six feet (perceived focal length 212-3), and ten feet (perceived focal length 212-4).

The eye box represents an area within which the eye can move, and still perceive the focal layers as one image. In this example HMD device, the eye box includes the tip of the triangle representing the field of view 202, and an area plus or minus one millimeter around the tip. Thus, shifting the eye outside of the eye box may prevent the focal layers from appearing as one image. Instead, the individual focal layers may be visible.

In some embodiments, the HMD 102 may include a high precision, low latency eye tracker that monitors the eye position and the dilation of the pupil. Thus, the controller 106 may provide the eye tracker information to the focal stack renderer 110, and request a re-computation of the focal stack. In this way, the focal layers may be displayed in a way that enables the viewer to perceive the focal stack as one image. In some embodiments, the eye tracker may use infrared lens-imaging technology.

Figure 3:
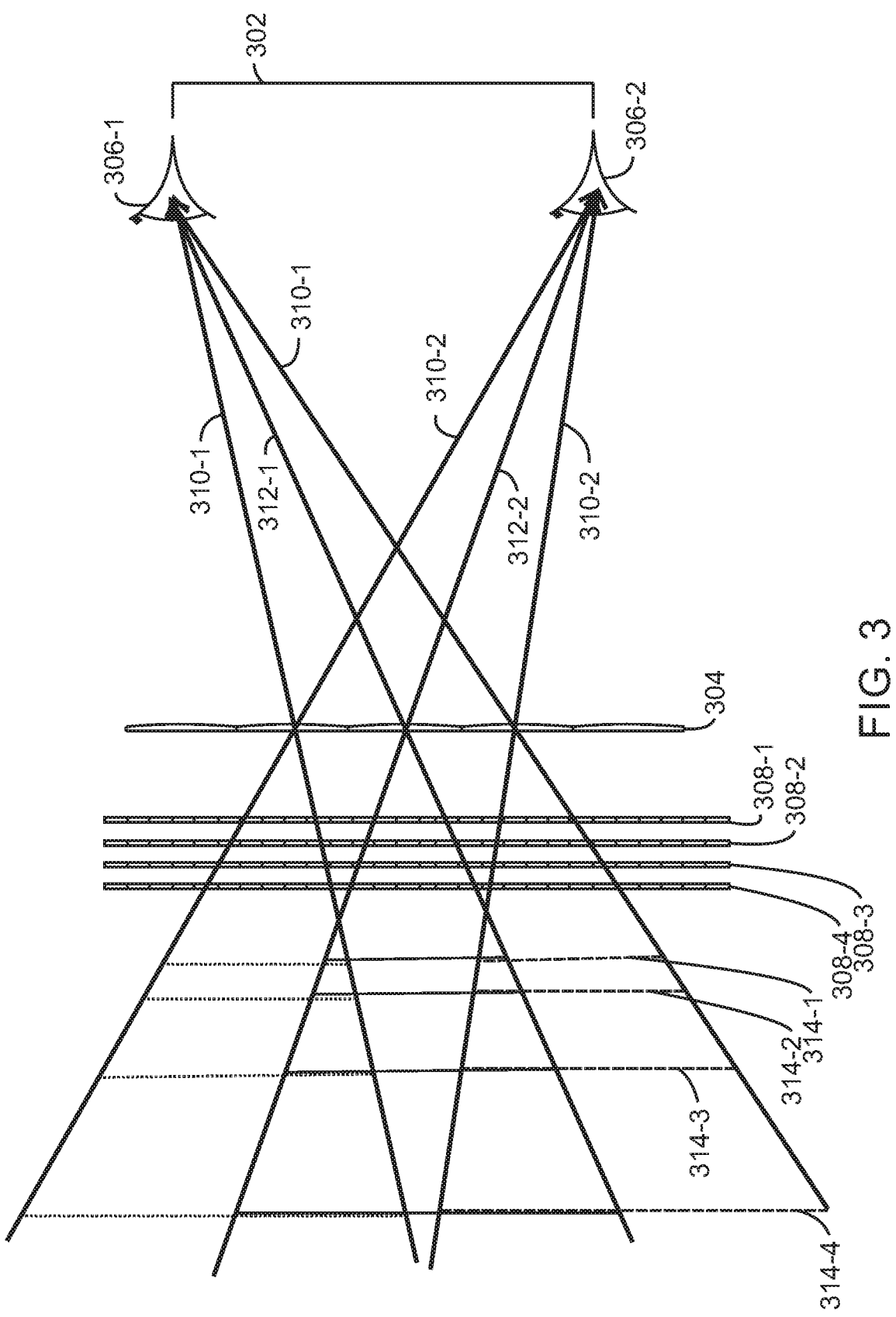
FIG. 3 illustrates an example eye box for an example HMD device with a lens array.

FIG. 3 illustrates an example eye box 302 for an example HMD device with a lens array 304. The eye box 302 is the area between eye position 306-1 and eye position 306-2 that includes all the possible viewing positions of the pupil as an eye moves with respect to the scatter shutters 308 (including scatter shutter 308-1, scatter shutter 308-2, scatter shutter 308-3, and scatter shutter 308-4). The field of view 310-1 represents the view from the border 306-1 of the eye box 302, and includes the corresponding line of sight 312-1. The field of view 310-2 represents the view from the border 306-2 of the eye box, and includes the corresponding line of sight 312-2. As shown, the lines of sight 312-1, 312-2 travel from the position of the eye, through the lens array 304, to the four scatter shutters 308-1 to 308-4, and their respective perceived focal lengths 314-1 to 314-4.

The lens array 304 include multiple lenslets (small lenses) that are in the same plane, and parallel with respect to the scatter shutters 308. The lens array 304 directs the light from the scatter shutter 308-1, scatter shutter 308-2, scatter shutter 308-3, and scatter shutter 308-4 to the eye of the viewer. Additionally, the diffuser plates are located according to the required optical image distances and the focal length of the lenslets. In some embodiments, the lens array 304 relays light from different groups of pixels of the scatter shutters 308 to different eye positions within the eye box 302. Thus for each eye position the correspondent groups of pixels are viewed as a focal stack visible from that position. This makes it possible to generate different focal stacks for the different eye positions by combining the light field approach with the multi-focal HMD device. Using the lens array 304 thus makes it possible to expand the eye box beyond the small area described with respect to FIG. 2. Referring back to FIG. 3, the colors of the individual pixels of each focal stack may be distributed among multiple focal layers, so the color that appears to the viewer is blended across the focal stack. In other words, each pixel is a different color in each focal layer, making a different contribution to the color perceived by the viewer. Accordingly, this pixel color distribution may be depth-weighted, or generated using a more complex and higher quality focal stack, or even a light field data. Being depth-weighted means that the contribution of each individual pixel at each focal layer is weighted based on the depth of the pixel.

Figure 4:
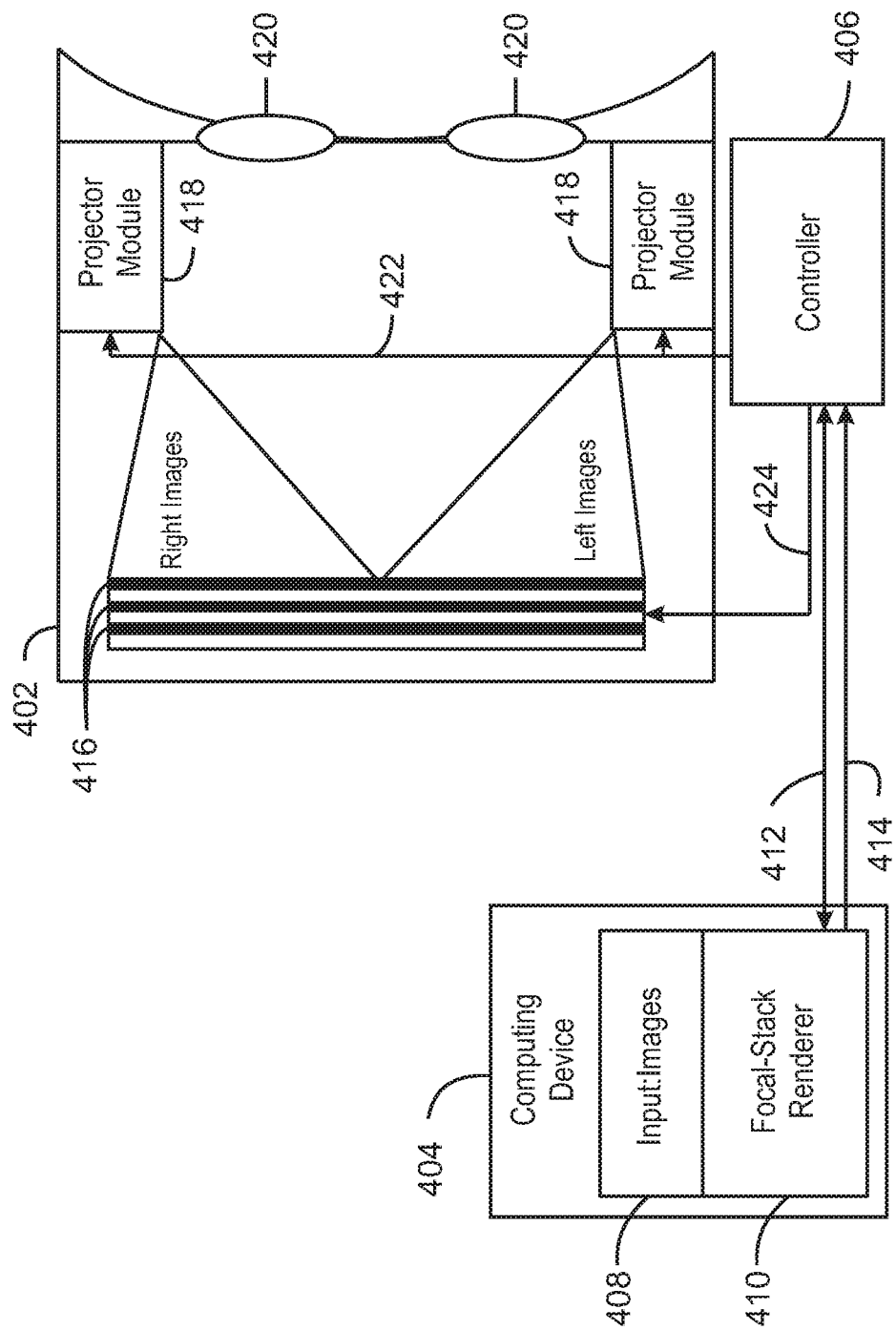
FIG. 4 illustrates an example system for an HMD device.

FIG. 4 illustrates an example system 400 for the HMD device 402. The system 400 includes the HMD device 402, a computing device 404, and a controller 406. The computing device 404 may be a computing device, such as the computing device 102 described with respect to FIG. 1. Referring back to FIG. 4, the computing device 404 includes Input Images 408 and a focal-stack renderer 410. The input images 408 may be data representations of 3D scenes that are rendered into focal stacks by the focal stack renderer 410. The HMD device 402 may be a device, that attaches to the head, and that, in conjunction with an application (not shown) running on the computing device 404, for example, provides an image for creating an immersive, 3D, visual reality that may replace or augment the real world view. The computing device 404 may provide bus commands to the controller 406 to display a 3D scene on the HMD device 402 over communication link 412. The communication link 412 may be a universal serial bus (USB), for example. The controller 406 may request that the focal stack renderer 410 render focal stacks for the image data 408 based on eye positions and pupil diameter widths. In response, the focal stack renderer 410 may provide the focal stacks to the controller 406 over communication link 414. The communication link 414 may be a high data speed transmission link, such as a high definition multimedia interface (HDMI) link, a DisplayPort (DP) link, etc.

The HMD device 402 includes scatter shutters 416, projector modules 418, and lenses 420. The scatter shutters 416 serve as the displays of the HMD device 402 by providing projection surfaces for right images and left images, which are projected in focal stacks by the projector modules 418. Each of the scatter shutters 416 is associated with a different focal length. Accordingly, each of the focal layers is projected onto the scatter shutter 416 associated with the focal length of the focal layer. The associated focal lengths of the scatter shutters 416 grow further from the scatter shutter 416 nearest the lenses 420 to the scatter shutter 416 furthest from the lenses 420. The scatter shutters 416 are spaced in coordination with the focal length of the lenses 420 in order to provide a 3D scene displayed at multiple required depths, preferably spanning the human vision accommodation range. For example, lenses 420 with a 45 millimeter (mm) focal length may be used with a 5 mm inter-shutter 416 spacing to provide a two meter visual range, as seen through the lenses 420. In some embodiments, the inter-shutter spacing is so that it provides a two and a half diopters spacing between optical images of the shutters. A diopter is a unit of measurement of the optical power of the lenses 420.

Additionally, the scatter shutters 416 are electrically switchable between a scattering, or opaque, state and a transparent state. The scatter shutters 416 may be driven by an alternating current (AC) pulse, which the controller 406 sends through a film on the scatter shutters 416 that orients the molecules of the scatter shutters 416 to either scatter light or let light through. The scatter shutters 416 turn opaque when they scatter light, and turn transparent when they let light through. The scatter shutters 416 may be liquid crystal shutters, for example. When in the opaque state, an individual scatter shutter 416 scatters the light projected by the projector modules 418, providing a projection surface that is viewable through the lenses 420. When in the transparent state, the scatter shutter 416 allows light from the projector modules 418 to pass through to the scatter shutter 116 being used as the projection surface, i.e., the scatter shutter 116 being turned opaque. Additionally, the transparent scatter shutter allows the light reflected from the projection surface to also pass in an opposite direction, towards the lenses 420. In this way, focal layers projected on scatter shutters behind one or more transparent scatter shutters may be made viewable. The HMD device 402 shows three scatter shutters 416. However, in some embodiments, the HMD device 402 may include more or fewer scatter shutters 416.

The projector modules 418 are HMD device-appropriate sized projection devices capable of projecting stereo images on the scatter shutters 416. The projector modules 418 may be liquid crystal on silicon (LCoS) devices, digital micromirror devices (DMDs), laser scanners, and/or other microprojection devices. Because the scatter shutters 416 are within a few millimeters of each other, the focus of the projector modules 418 may remain static while projecting each of the focal layers. The lenses 420 may be a focusing material with a focal length that enables the eyes to see in a focused manner the 3D scenes being displayed on the scatter shutters 416. The lines from the projector modules 418 to the scatter shutters 416 represent the path of light to the scatter shutters 416.

The controller 406 communicates with the projector modules 418 over a communication link 422. The controller 406 communicates with the scatter shutters 416 over a communication link 424. In some embodiments, communication link 422 and communication link 424 can be a common communication link. The controller 406 may coordinate the projection of the individual focal layers on the focal length-appropriate scatter shutters 416 using communication link 422 and/or communication link 424 so that the focal stack appears within one frame of the 3D scene. For example, the controller 406 may provide to each projector module 418, the focal stack for one frame of a 3D scene from a right or left eye perspective, and electrically signal the projector modules 418 to project the focal stack onto the scatter shutters 416. Further, the controller 406 may signal the appropriate scatter shutters 416 to turn opaque or transparent based on which scatter shutter 416 is being used for the projection surface of the focal layer.

Additionally, the controller 406 may specify when to project the focal layers, and when the scatter shutters 416 are to turn opaque or transparent. In this way, the projection of each focal layer can be coordinated with making the focal length-appropriate scatter shutter 416 available as a projection surface. For example, when the scatter shutter 416 closest to the lenses 420 is used as the projection surface, the controller 406 may signal the scatter shutter 416 closest to the lenses 420 to turn opaque, at a time when the light of the focal layer is being projected at the scatter shutter 416. Additionally, the controller 406 may signal the scatter shutters 416 behind the closest scatter shutter 416 to turn transparent. Similarly, when the scatter shutter 416 furthest from the lenses 420 is used as the projection surface, in addition to signaling the furthest scatter shutter 416 to turn opaque, the scatter shutters 416 between the furthest scatter shutter 416 and the lenses 420 are signaled to turn transparent. Hence, by timing the projection for each focal length image in synchronization with the switching of the scatter shutters 416 to the appropriate opaque or transparent states, each focal layer may be displayed on the scatter shutter 416 associated with the focal length of that focal layer.

In some embodiments, the individual focal layers for a single frame are displayed in reverse focal length order, where the focal layer with the greatest focal length is displayed first on the scatter shutter 416 furthest from the lenses 420, and the focal layer with the smallest focal length is displayed last on the scatter shutter 416 closest to the lenses 420. When transitioning from one scatter shutter 416 to the next with a new focal image, the scatter shutter 416 previously used is turned transparent, and the new scatter shutter 416 is turned opaque. However, if the previous shutter 416 is turned transparent before the new shutter 416 is turned opaque, light leaking may occur. Light leaking occurs when the projector modules 418 project light beyond the intended scatter shutter 416. Accordingly, in some embodiments, the new scatter shutter 416 is turned opaque before the previous scatter shutter 416 is turned transparent.

In some embodiments, the back enclosure (not shown) of the HMD device 402 is transparent for augmented reality experiences. In such embodiments, after the focal stack is displayed, the scatter shutters 416 may be switched to the transparent state to integrate the 3D scene with a real world view. In such embodiments, the real world view is provided in the same frame in which the focal stack is displayed. Further, the lenses 420 may be electrically switchable between a transparent state and a focusing state. As such, when the lenses 420 are in the focusing state, the eyes can focus on the focal layers displayed on the scatter shutters 416. However, when the lenses 420 are in the transparent state, all the scatter shutters 416 appear transparent and the eyes can focus on the real world view. Such lenses 420 may be implemented using electro wetting, liquid lens, or liquid crystal-based technologies, for example.

In some embodiments, the HMD device 402 may use transparent display devices to display the focal layers, instead of projecting the focal layers on the scatter shutters 416. In some embodiments, for example, the transparent display devices can be transparent organic light-emitting diode (OLED) display devices. Transparent displays are devices capable of providing a display that is electrically switchable between a display state and a transparent state. Thus, when the transparent display is in a display state, the transparent display itself displays the focal layer based on the associated focal length. More specifically, the controller 406 may provide each of the focal layers to the focal length-appropriate transparent display for the focal layer, and coordinate the transition of the transparent display devices between a viewable state where the focal layer is displayed, and a transparent state that makes another focal layer or the real world view, viewable through the transparent display device. Similar to the scatter shutters 416, such transparent display devices may display the focal layers in forward or reverse focal length order, or in a random order.

Figure 5:
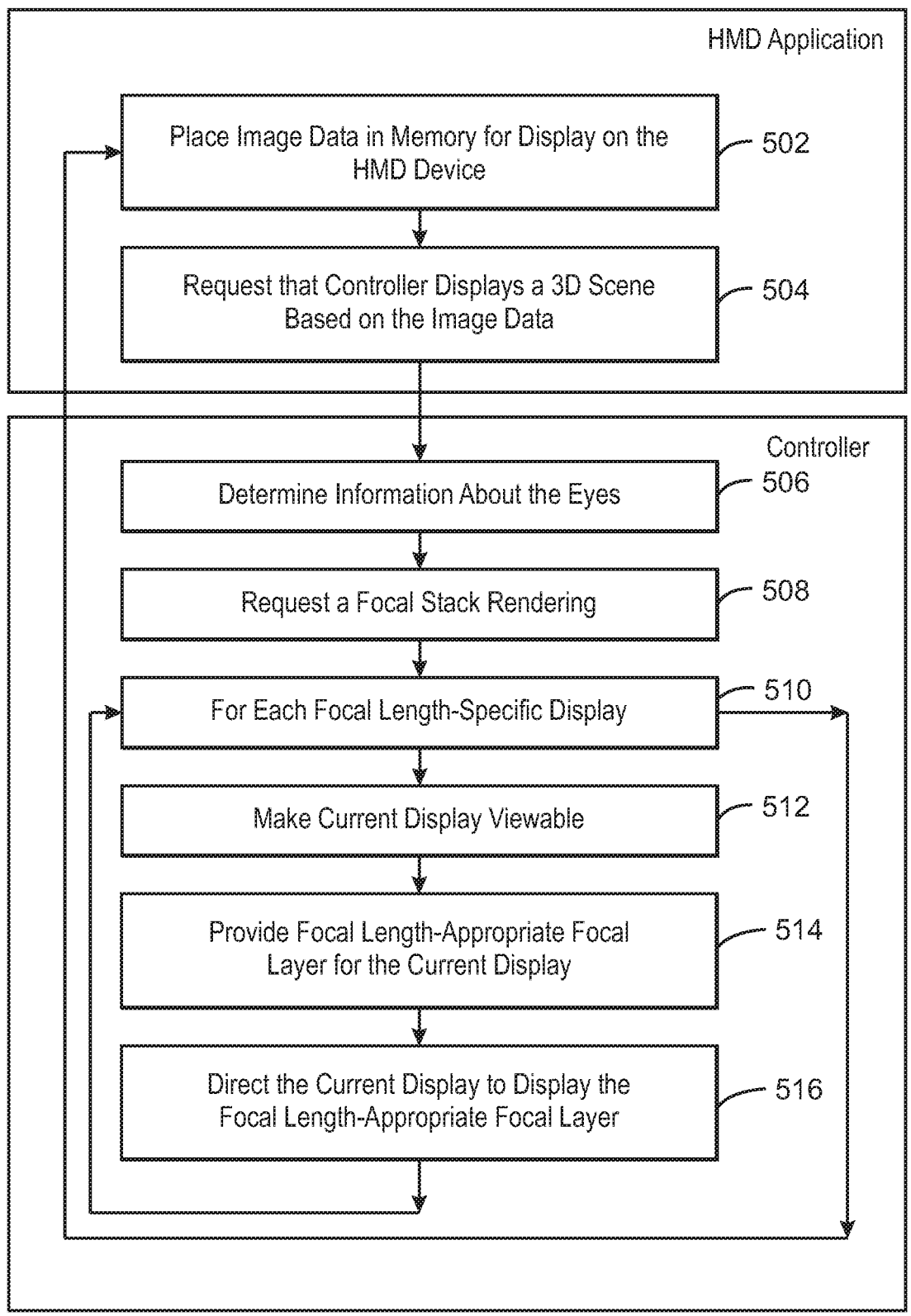
FIG. 5 illustrates a process to display a 3D scene on an HMD device.

FIG. 5 illustrates a process 500 to display a 3D scene on an HMD device (for example, an HMD device such as HMD device 102 and/or HMD device 402). The process 500 may be performed by an HMD application (for example HMD application 124) and a controller (for example, controller 106 and/or controller 406), for example. At block 502 the HMD application may place image data (for example, image data 122) in memory for display on the HMD device. As stated previously, the image data may be a rendered 3D image, light field data, stereo images, and the like. At block 504, the HMD application may make a driver request to the controller to display a 3D scene on the HMD device using the image data. For each frame of the 3D scene to be displayed on the HMD device, the HMD application may make this display request to the controller.

At block 506, the controller may determine information about the eyes to help align the focal layers to appear as one image. For example, the controller may request that the eye tracker provide the position of the eyes in the HMD device, and/or provide the diameters of the pupils. As discussed previously, the eye position within the HMD device may change throughout the HMD device experience. Additionally, the HMD device may move or slip on the user's head if the user is actively moving while wearing the HMD device. Thus, the eye position and pupil width may be used to render the focal stack to appear as a single image.

At block 508, the controller may request a focal stack rendering from the focal stack renderer (for example, the focal stack renderer 110) based on the image data for the 3D scene, the focal lengths associated with each of the focal length-specific displays (for example, each of the focal length-specific displays 108), and the eye and pupil information. Additionally, in embodiments of the HMD device including a lens array, the controller may also request a focal stack for specific sets of pixels on the focal length-specific displays. The renderings for the layers of the focal stack may be based on the previous eye position. In some embodiments, tracking eye position and pupil width at 120 Hz may make it possible to dynamically change focus on a per frame basis.

Blocks 510-516 are performed for each focal length-specific display in the HMD device. Once blocks 510-516 are performed for each focal length-specific display in the HMD device, the process flows from block 510 to block 502 for the next frame provided by the HMD application.

However, while performing blocks 510-516, the process flows from block 510 to block 512. At block 512, the controller may make a current display viewable by making the focal length-specific displays between the lenses (for example, the lenses 110 and/or 420) and the current display transparent. This allows the light from the current display to be viewable from the lenses. At block 514, the controller may provide the focal length-appropriate layer for the current display.

At block 516, the controller may direct the current display to display the focal layer provided at block 514. In embodiments with scatter shutters (for example, scatter shutters 116 and/or scatter shutters 416), the controller sends a signal to the current scatter shutter to turn opaque. Additionally, the controller may send a signal to the projector modules (for example, projector modules 420) to project the focal layer for the current display. As stated previously, the entire focal stack is displayed within one frame. As such, all of the focal layers of the focal stack are displayed within one period of the frame rate. Thus, the time to display each focal layer is determined by the frame rate and the number of displays. For example, to display a 60 Hz (60 frames per second) video on an HMD device with three focal length-specific displays (for example, three focal length-specific displays 108), the controller provides 180 Hz of frame data (three focal layers every $\frac{1}{60}^{th}$) of a second. Thus, the time to display each focal layer may be $\frac{1}{180}^{th}$ of a second. Further, the controller accounts for the time to transition between displaying each image. Thus, the time to display each focal layer for a 60 Hz frame rate on three focal length-specific displays 108 is $\frac{1}{180}^{th}$ of a second minus the transition time. When the entire focal stack has been displayed on all the focal length-specific displays, control flows back to block 502 for the next frame of the 3D scene.

Figure 6:
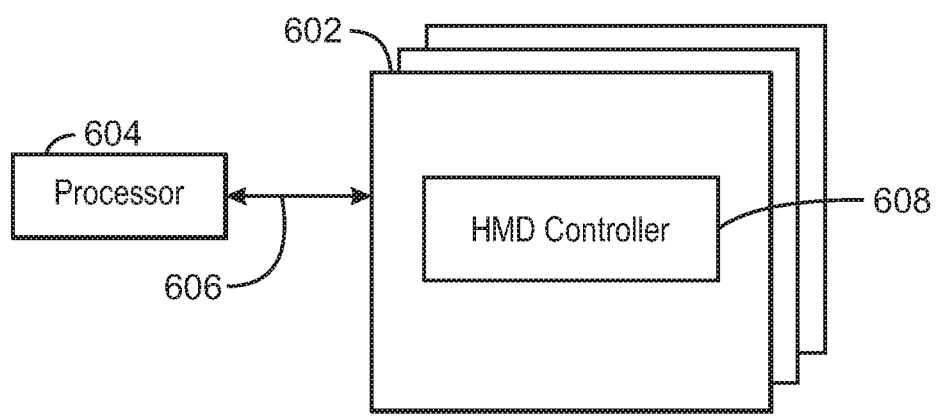
FIG. 6 illustrates an example system showing one or more computer readable media that stores code for an HMD device.

FIG. 6 is a block diagram showing a computer system 600 containing one or more computer-readable media 602 to display 3D scenes on an HMD device (for example, on HMD device 102 and/or on HMD device 402). The computer readable media 602 may be accessed by a processor 604 over a computer bus 606. The processor 604 may be any computer processor, graphics processor, or combinations thereof. The computer-readable media 602 may include code configured to direct the processor 604 to perform methods and embodiments described herein. In some embodiments, the computer-readable media 602 may be non-transitory computer-readable media. In some examples, the computer readable media 602 may be storage media. However, in any case, the computer-readable media do not include transitory media such as carrier waves, signals, and the like.

The block diagram of FIG. 6 is not intended to indicate that the computer readable media 602 is to include all of the components shown in FIG. 6. Further, the computer-readable media 602 may include any number of additional components not shown in FIG. 6, depending on the details of the specific implementation.

Various features and components discussed herein may be stored on one or more computer readable media 602, as indicated in FIG. 6. For example, an HMD controller 608 can display 3D scenes with multiple focal lengths in the HMD controller 608 by displaying multiple focal layers on multiple focal length-specific displays (for example, on multiple focal length-specific displays 108).

In an example implementation, a controller 106 for an HMD 102 receives a driver request to display a 3D scene on the HMD 102. The controller 106 determines information about the viewer's eyes in order to have the focal layers appear as one image in a frame. Additionally, the controller 106 request a focal stack rendering of the image data based on the focal lengths of the focal length-specific displays 108, and the eye information. For each focal length-specific display 108, the current display is made viewable by making all the focal length-specific displays 108 between the current display and the lenses 110 transparent. The controller 106 also provides the focal length-appropriate focal layer to the current display. Additionally, the controller 106 directs the current display to display the focal length-appropriate focal layer.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

Figure 7:
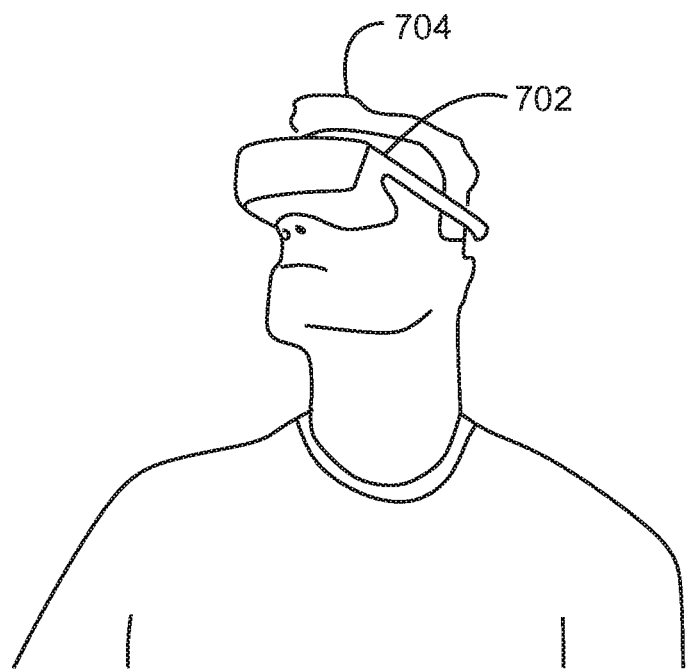
FIG. 7 illustrates a viewer wearing an example system for an HMD device.

FIG. 7 illustrates a wearable system for an HMD device 702. A viewer 704 may secure the system for HMD device 702 over the eyes in order to view a 3D experience. The HMD device 702 may be a device, such as any of the HMD devices described herein, including for example, 3D augmented reality or virtual reality (AR/VR) glasses. As stated previously, an example HMD device and computing device can be integrated. Integrating an HMD device, such as the HMD device 702 with the computing device may provide the user with freedom of movement, as opposed to being tethered by cable or wireless connection to a potentially immobile desktop computer, for example. Accordingly, the wearable system may include the HMD device 702 and an integrated computing device (not shown), such as a system on a chip (SoC), for example. While an SoC may be used, the computing device may be a device, such as computing devices 104, 404, 604, described with respect to FIGS. 1, 4, and 6, respectively. In some embodiments, the integrated computing device may be located within the HMD device 702, and thus, not viewable.

Reference in the specification to "an example", "some examples", "one embodiment", "some embodiments", "an embodiment", etc. of the disclosed subject matter means that a particular feature, structure, or characteristic described in connection with the embodiment or example is included in at least one embodiment or example of the disclosed subject matter. Thus, the phrase "in one embodiment" or "one example" may appear in various places throughout the specification, but the phrase may not necessarily refer to the same embodiment.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, graphics processing units, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

EXAMPLES

Example 1 includes a head-mounted display (HMD) device that includes a group of displays arranged in parallel with each other, each of the displays being associated with one of a group of focal lengths. The HMD device includes a group of lenses to view a three-dimensional (3D) scene on the group of displays. Additionally, the HMD device includes a controller to provide a frame of the 3D scene, viewable at a group of focal lengths by displaying the focal layers in a sequence on the displays. The frame includes a group of focal layers, each of the focal layers generated at one of the focal lengths. Each of the focal layers is displayed on one of the displays associated with a focal length at which the focal layer is generated. The controller also allows visible light to pass through one or more of the displays based on whether a display is disposed between a displayed focal layer and the lenses. The frame of the 3D scene appears in focus.

Example 2 includes the HMD device of example 1. In some examples, the displays include transparent organic light emitting diode displays.

Example 3 includes the HMD device of example 1. In some examples, the displays are arranged in focal length sequence starting from closest to the lenses to a display most distant from the lenses.

Example 4 includes the HMD device of example 1. In some examples, the lenses are in an on state focusing on the displays when the 3D scene is being displayed. The 3D scene is associated with an augmented reality experience. Additionally, the lenses are in an off state when the displays allow visible light of a real world view to pass through to the lenses once for the frame.

Example 5 includes the HMD device of example 1. In some examples, the 3D scene is associated with a virtual reality experience.

Example 6 includes the HMD device of example 1. In some examples, the lenses include a group of lens arrays including micro lens arrays. The lens arrays expand a size of an eye box by generating a group of focal stack views for a group of different eye positions.

Example 7 includes the HMD device of example 1, including a pair of projector modules. In some examples, the displays include a group of scatter shutters. Additionally, the projector modules project the focal layers on the scatter shutters.

Example 8 includes the HMD device of example 7. In some examples, the scatter shutters include two or more scatter shutters.

Example 9 includes the HMD device of example 7. In some examples, the scatter shutters are to provide projection surfaces for the projector modules by turning opaque in response to a signal from the controller.

Example 10 includes the HMD device of example 1. In some examples, the displays are to allow the visible light to pass through by turning transparent in response to a signal from the controller.

Example 11 includes the HMD device of example 1. In some examples, the frame of the 3D scene appears in focus, and provides a parallax effect.

Example 12 includes a method of displaying 3D scenes via an HMD device. The method includes providing a frame of a 3D scene, viewable at a group of focal lengths, the frame including a group of displayed focal layers, each of the focal layers generated at one of the focal lengths, by displaying the focal layers in a sequence on a group of displays, each of the displays being associated with one of the focal lengths, and each of the focal layers being displayed on one of the displays associated with a focal length at which the focal layer is generated. The method includes allowing visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The frame of the 3D scene appears in focus, and provides a parallax effect.

Example 13 includes the method of example 12. In some examples, the displays include transparent organic light emitting diode displays.

Example 14 includes the method of example 12. In some examples, the displays are arranged in focal length sequence starting from closest to the lenses to a display most distant from the lenses.

Example 15 includes the method of example 12. In some examples, the 3D scene is associated with an augmented reality experience. Additionally, the displays allow visible light of a real world view to pass through to the lenses once for the frame.

Example 16 includes the method of example 12. In some examples, the 3D scene is associated with a virtual reality experience.

Example 17 includes the method of example 12, the HMD device including a pair of projector modules. In some examples, the displays include a group of scatter shutters. Additionally, the projector modules project the focal layers on the scatter shutters.

Example 18 includes the method of example 17. In some examples, the scatter shutters include four scatter shutters.

Example 19 includes the method of example 18. In some examples, the scatter shutters provide projection surfaces for the projector modules by turning opaque in response to an electrical signal.

Example 20 includes the method of example 12. In some examples, the displays allow the visible light to pass through by turning transparent in response to an electrical signal.

Example 21 includes the method of example 12. In some examples, the lens arrays include micro lens arrays.

Example 22 includes the method of example 12. In some examples, the frame of the 3D scene appears in focus, and provides a parallax effect.

Example 23 includes a display apparatus that includes means to provide a frame of a 3D scene, viewable at a group of focal lengths, the frame including a group of displayed focal layers, each of the focal layers generated at one of the focal lengths, by displaying the focal layers in reverse focal length sequence on a group of displays, each of the displays being associated with one of the focal lengths, and each of the focal layers being displayed on one of the displays associated with a focal length at which the focal layer is generated. The display apparatus includes means to allow visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The lens arrays include micro lens arrays. Additionally, the frame of the 3D scene appears in focus, and provides a parallax effect.

Example 24 includes the display apparatus of example 21. In some examples, the displays include transparent organic light emitting diode displays.

Example 25 includes the display apparatus of example 21. In some examples, the 3D scene is associated with an augmented reality experience. Additionally, the displays allow visible light of a real world view to pass through to the lenses once for the frame.

Example 26 includes the display apparatus of example 21. In some examples, the 3D scene is associated with a virtual reality experience.

Example 27 includes one or more tangible, non-transitory computer readable media for a head-mounted display (HMD) device, including a group of instructions that, in response to being executed on a processor, cause the processor to provide a frame of a 3D scene, viewable at a group of focal lengths, the frame including a group of displayed focal layers, each of the focal layers generated at one of the focal lengths, by displaying the focal layers in reverse focal length sequence on a group of displays, each of the displays being associated with one of the focal lengths, and each of the focal layers being displayed on one of the displays associated with a focal length at which the focal layer is generated. The instructions also cause the processor to allow visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The lens arrays include micro lens arrays. Additionally, the frame of the 3D scene appears in focus, and provides a parallax effect.

Example 28 includes the one or more tangible, non-transitory computer readable media of example 27. In some examples, the displays include transparent organic light emitting diode displays.

Example 29 includes the one or more tangible, non-transitory computer readable media of example 27. In some examples, the 3D scene is associated with an augmented reality experience. Additionally, the displays allow visible light of a real world view to pass through to the lenses once for the frame.

Example 30 includes the one or more tangible, non-transitory computer readable media of example 27. In some examples, the frame of the 3D scene appears in focus, and provides a parallax effect.

Example 31 includes a head-mounted display (HMD) device that includes a group of displays arranged in parallel with each other, each of the displays being associated with one of a group of focal lengths. The HMD device includes a group of lenses to view a three-dimensional (3D) scene on the group of displays. The HMD device includes a controller to provide a frame of the 3D scene, viewable at a group of focal lengths, the frame including a group of focal layers, each of the focal layers generated at one of the focal lengths, by displaying the focal layers in a sequence on the displays, each of the focal layers being displayed on one of the displays associated with a focal length at which the focal layer is generated. Additionally, the controller allows visible light to pass through one or more of the displays based on whether a display is disposed between a displayed focal layer and the lenses. The frame of the 3D scene appears in focus.

Example 32 includes the HMD device of example 31. In some examples, the displays include transparent organic light emitting diode displays.

Example 33 includes the HMD device of examples 31 or 32. In some examples, the displays are arranged in focal length sequence starting from closest to the lenses to a display most distant from the lenses.

Example 34 includes the HMD device of examples 31 through 33. In some examples, the lenses are in an on state focusing on the displays when the 3D scene is being displayed. The 3D scene is associated with an augmented reality experience. Additionally, the lenses are in an off state when the displays allow visible light of a real world view to pass through to the lenses once for the frame.

Example 35 includes the HMD device of examples 31 through 33. In some examples, the 3D scene is associated with a virtual reality experience.

Example 36 includes the HMD device of example 31. In some examples, the lenses include a group of lens arrays including micro lens arrays. The lens arrays expand a size of an eye box by generating a group of focal stack views for a group of different eye positions.

Example 37 includes the HMD device of example 31, including a pair of projector modules. In some examples, the displays include a group of scatter shutters. Additionally, the projector modules to project the focal layers on the scatter shutters.

Example 38 includes the HMD device of example 37. In some examples, the scatter shutters include two or more scatter shutters.

Example 39 includes the HMD device of example 37. In some examples, the scatter shutters are to provide projection surfaces for the projector modules by turning opaque in response to a signal from the controller.

Example 40 includes the HMD device of example 31. In some examples, the displays are to allow the visible light to pass through by turning transparent in response to a signal from the controller.

Example 41 includes a method of displaying 3D scenes via an HMD device. The method includes providing a frame of a 3D scene, viewable at a group of focal lengths, the frame including a group of displayed focal layers, each of the focal layers generated at one of the focal lengths, by displaying the focal layers in a sequence on a group of displays, each of the displays being associated with one of the focal lengths, and each of the focal layers being displayed on one of the displays associated with a focal length at which the focal layer is generated. The method includes allowing visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The frame of the 3D scene appears in focus, and provides a parallax effect.

Example 42 includes the method of example 41. In sore examples, the displays include transparent organic light emitting diode displays.

Example 43 includes the method of examples 41 or 42. The displays are arranged in focal length sequence starting from closest to the lenses to a display most distant from the lenses.

Example 44 includes the method of examples 41 through 43. The 3D scene is associated with an augmented reality experience. Additionally, the displays allow visible light of a real world view to pass through to the lenses once for the frame.

Example 45 includes the method of example 41 through 43. In some examples, the 3D scene is associated with a virtual reality experience.

Example 46 includes the method of example 41, the HMD device including a pair of projector modules. In some examples, the displays include a group of scatter shutters. Additionally, the projector modules project the focal layers on the scatter shutters.

Example 47 includes the method of example 46. In sore examples, the scatter shutters include four scatter shutters.

Example 48 includes the method of example 47. In some examples, the scatter shutters provide projection surfaces for the projector modules by turning opaque in response to an electrical signal.

Example 49 includes the method of example 41. In some examples, the displays allow the visible light to pass through by turning transparent in response to an electrical signal.

Example 50 includes a display apparatus that includes means to provide a frame of a 3D scene, viewable at a group of focal lengths, the frame including a group of displayed focal layers, each of the focal layers generated at one of the focal lengths, by displaying the focal layers in reverse focal length sequence on a group of displays, each of the displays being associated with one of the focal lengths, and each of the focal layers being displayed on one of the displays associated with a focal length at which the focal layer is generated. The display apparatus includes means to allow visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The lens arrays include micro lens arrays. Additionally, the frame of the 3D scene appears in focus, and provides a parallax effect.

Example 51 includes the display apparatus of example 47. In some examples, the displays include transparent organic light emitting diode displays.

Example 52 includes the display apparatus of examples 47 or 48. The 3D scene is associated with an augmented reality experience. Additionally, the displays allow visible light of a real world view to pass through to the lenses once for the frame.

Example 53 includes the display apparatus of examples 50 through 52. The 3D scene is associated with a virtual reality experience.

Example 54 includes one or more tangible, non-transitory computer readable media for a head-mounted display (HMD) device, including a group of instructions that, in response to being executed on a processor, cause the processor to provide a frame of a 3D scene, viewable at a group of focal lengths, the frame including a group of displayed focal layers, each of the focal layers generated at one of the focal lengths, by displaying the focal layers in reverse focal length sequence on a group of displays, each of the displays being associated with one of the focal lengths, and each of the focal layers being displayed on one of the displays associated with a focal length at which the focal layer is generated. The instructions cause the processor to allow visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The lens arrays include micro lens arrays. Additionally, the frame of the 3D scene appears in focus, and provides a parallax effect.

Example 55 includes the one or more tangible, non-transitory computer readable media of example 54. In some examples, the displays include transparent organic light emitting diode displays.

Example 56 includes a head-mounted display (HMD) device includes a group of displays arranged in parallel with each other, each of the displays being associated with one of a group of focal lengths. The HMD device includes a group of lenses to view a three-dimensional (3D) scene on the group of displays. The HMD device includes a controller to provide a frame of the 3D scene, viewable at a group of focal lengths, the frame including a group of focal layers, each of the focal layers generated at one of the focal lengths, by displaying the focal layers in a sequence on the displays, each of the focal layers being displayed on one of the displays associated with a focal length at which the focal layer is generated. The controller allows visible light to pass through one or more of the displays based on whether a display is disposed between a displayed focal layer and the lenses. The frame of the 3D scene appears in focus.

Example 57 includes the HMD device of example 56. In some examples, the displays include transparent organic light emitting diode displays.

Example 58 includes the HMD device of examples 56 or 57. The displays are arranged in focal length sequence starting from closest to the lenses to a display most distant from the lenses.

Example 59 includes the HMD device of examples 56 through 58. The lenses are in an on state focusing on the displays when the 3D scene is being displayed. The 3D scene is associated with an augmented reality experience. Additionally, the lenses are in an off state when the displays allow visible light of a real world view to pass through to the lenses once for the frame.

Example 60 includes the HMD device of examples 56 through 58. The 3D scene is associated with a virtual reality experience.

Example 61 includes the HMD device of example 56. In some examples, the lenses include a group of lens arrays including micro lens arrays. The lens arrays expand a size of an eye box by generating a group of focal stack views for a group of different eye positions.

Example 62 includes the HMD device of example 56, including a pair of projector modules. In some examples, the displays include a group of scatter shutters. Additionally, the projector modules project the focal layers on the scatter shutters.

Example 63 includes the HMD device of example 62. In some examples, the scatter shutters include two or more scatter shutters.

Example 64 includes the HMD device of example 62. In some examples, the scatter shutters are to provide projection surfaces for the projector modules by turning opaque in response to a signal from the controller.

Example 65 includes a method of displaying 3D scenes via an HMD device, the method including providing a frame of a 3D scene, viewable at a group of focal lengths, the frame including a group of displayed focal layers, each of the focal layers generated at one of the focal lengths, by displaying the focal layers in a sequence on a group of displays, each of the displays being associated with one of the focal lengths, and each of the focal layers being displayed on one of the displays associated with a focal length at which the focal layer is generated. The method includes allowing visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The frame of the 3D scene appears in focus, and provides a parallax effect.

Example 66 includes a display apparatus including means to provide a frame of a 3D scene, viewable at a group of focal lengths, the frame including a group of displayed focal layers, each of the focal layers generated at one of the focal lengths, by displaying the focal layers in reverse focal length sequence on a group of displays, each of the displays being associated with one of the focal lengths, and each of the focal layers being displayed on one of the displays associated with a focal length at which the focal layer is generated. The display apparatus includes means to allow visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The lens arrays include micro lens arrays. Additionally, the frame of the 3D scene appears in focus, and provides a parallax effect.

Example 67 includes the display apparatus of example 66. In some examples, the displays include transparent organic light emitting diode displays.

Example 68 includes one or more tangible, non-transitory computer readable media for a head-mounted display (HMD) device, including a group of instructions that, in response to being executed on a processor, cause the processor to provide a frame of a 3D scene, viewable at a group of focal lengths, the frame including a group of displayed focal layers, each of the focal layers generated at one of the focal lengths, by displaying the focal layers in reverse focal length sequence on a group of displays, each of the displays being associated with one of the focal lengths, and each of the focal layers being displayed on one of the displays associated with a focal length at which the focal layer is generated. The instructions cause the processor to allow visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The lens arrays include micro lens arrays. Additionally, the frame of the 3D scene appears in focus, and provides a parallax effect.

Example 69 includes the one or more tangible, non-transitory computer readable media of example 68. In some examples, the displays include transparent organic light emitting diode displays.

Example 70 includes the one or more tangible, non-transitory computer readable media of example 68. In some examples, the scatter shutters include two or more scatter shutters.

Example 71 includes a head-mounted display (HMD) device includes a group of displays arranged in parallel with each other, each of the displays being associated with one of a group of focal lengths. The HMD device includes a group of lenses to view a three-dimensional (3D) scene on the group of displays. The HMD device includes a controller to provide a frame of the 3D scene, viewable at a group of focal lengths, the frame including a group of focal layers, each of the focal layers generated at one of the focal lengths, by displaying the focal layers in a sequence on the displays, each of the focal layers being displayed on one of the displays associated with a focal length at which the focal layer is generated. The controller allows visible light to pass through one or more of the displays based on whether a display is disposed between a displayed focal layer and the lenses. The frame of the 3D scene appears in focus.

Example 72 includes the HMD device of example 71. In some examples, the displays include transparent organic light emitting diode displays.

Example 73 includes the HMD device of examples 71 or 72. The displays are arranged in focal length sequence starting from closest to the lenses to a display most distant from the lenses.

Example 74 includes the HMD device of examples 71 through 73. The lenses are in an on state focusing on the displays when the 3D scene is being displayed. The 3D scene is associated with an augmented reality experience. Additionally, the lenses are in an off state when the displays allow visible light of a real world view to pass through to the lenses once for the frame.

Example 75 includes the HMD device of examples 71 through 73. The 3D scene is associated with a virtual reality experience.

Example 76 includes the HMD device of example 71. In some examples, the lenses include a group of lens arrays including micro lens arrays. The lens arrays expand a size of an eye box by generating a group of focal stack views for a group of different eye positions.

Example 77 includes the HMD device of example 71, including a pair of projector modules. In some examples, the displays include a group of scatter shutters. Additionally, the projector modules to project the focal layers on the scatter shutters.

Example 78 includes the HMD device of example 77. In some examples, the scatter shutters include two or more scatter shutters.

Example 79 includes the HMD device of example 77. In some examples, the scatter shutters are to provide projection surfaces for the projector modules by turning opaque in response to a signal from the controller.

Example 80 includes the HMD device of example 71. In some examples, the displays are to allow the visible light to pass through by turning transparent in response to a signal from the controller.

Example 81 includes a method of displaying 3D scenes via an HMD device, the method including providing a frame of a 3D scene, viewable at a group of focal lengths, the frame including a group of displayed focal layers, each of the focal layers generated at one of the focal lengths, by displaying the focal layers in a sequence on a group of displays, each of the displays being associated with one of the focal lengths, and each of the focal layers being displayed on one of the displays associated with a focal length at which the focal layer is generated. The method includes allowing visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The frame of the 3D scene appears in focus, and provides a parallax effect.

Example 82 includes the method of example 81. In some examples, the displays include transparent organic light emitting diode displays.

Example 83 includes the method of examples 81 or 82. The displays are arranged in focal length sequence starting from closest to the lenses to a display most distant from the lenses.

Example 84 includes the method of examples 81 through 83. The 3D scene is associated with an augmented reality experience. Additionally, the displays allow visible light of a real world view to pass through to the lenses once for the frame.

Example 85 includes the method of example 81 through 83. In some examples, the 3D scene is associated with a virtual reality experience.

Example 86 includes the method of example 81, the HMD device including a pair of projector modules. In some examples, the displays include a group of scatter shutters. Additionally, the projector modules project the focal layers on the scatter shutters.

Example 87 includes the method of example 86. In some examples, the scatter shutters include four scatter shutters.

Example 88 includes the method of example 87. In some examples, the scatter shutters provide projection surfaces for the projector modules by turning opaque in response to an electrical signal.

Example 89 includes the method of example 81. In some examples, the displays allow the visible light to pass through by turning transparent in response to an electrical signal.

Example 90 includes a display apparatus that includes means to provide a frame of a 3D scene, viewable at a group of focal lengths, the frame including a group of displayed focal layers, each of the focal layers generated at one of the focal lengths, by displaying the focal layers in reverse focal length sequence on a group of displays, each of the displays being associated with one of the focal lengths, and each of the focal layers being displayed on one of the displays associated with a focal length at which the focal layer is generated. The display apparatus includes means to allow visible light to pass through one or more of the displays based on whether a display is disposed between a displayed focal layer and one of a group of lens arrays of the HMD device. The lens arrays expand a size of an eye box of the HMD device by generating a group of focal stack views for a group of different eye positions. The lens arrays include micro lens arrays. Additionally, the frame of the 3D scene appears in focus, and provides a parallax effect.

Example 91 includes the display apparatus of example 90. In some examples, the displays include transparent organic light emitting diode displays.

Example 92 includes the display apparatus of examples 90 or 91. The 3D scene is associated with an augmented reality experience. Additionally, the displays allow visible light of a real world view to pass through to the lenses once for the frame.

Example 93 includes the display apparatus of examples 90 through 92. The 3D scene is associated with a virtual reality experience.

Example 94 includes the display apparatus of examples 90 through 92. The 3D scene is associated with a virtual reality experience.

Example 95 includes the display apparatus of examples 90 through 92, the HMD device including a pair of projector modules. The displays include a group of scatter shutters. Additionally, the projector modules project the focal layers on the scatter shutters.

What is claimed is:

1. A head-mountable display (HMD) device, comprising:
   at least one projector;
   a plurality of scatter shutters, ones of the plurality of scatter shutters associated with a respective focal length;
   lenses to provide a view of a three-dimensional (3D) scene; and
   a controller to:
      request or perform a rendering of multiple focus images based on eye tracker information relating to a tracking of one or more eyes of a user of the HMD device, the eye tracker information including eye orientation and pupil dilation of the user, wherein the multiple focus images correspond to one or more of the focal lengths,
      display, via the at least one projector, a frame of the 3D scene on the scatter shutters, the frame viewable at the focal lengths, the frame including a plurality of focal layers relating to the rendering of the multiple focus images at respective ones of the focal lengths, the multiple focus images displayed on respective ones of the scatter shutters for a duration,
      adjust the duration based on a period of a frame rate divided by a number of the scatter shutters minus a transition time, the frame rate corresponding to the 3D scene, the transition time corresponding to a first time to turn a first one of the scatter shutters opaque and a second time to turn a second one of the scatter shutters transparent,
      select, based on the eye tracker information, the first one of the scatter shutters corresponding to a projection surface, and
      cause the first one of the scatter shutters to turn opaque and the second one of the scatter shutters to turn transparent based on the selection, the first one of the scatter shutters to turn opaque in response to the controller providing an alternating current pulse through a film of the first one of the scatter shutters.

2. The HMD device of claim 1, wherein the scatter shutters include transparent organic light emitting diode displays.

3. The HMD device of claim 1, wherein the scatter shutters are arranged in focal length sequence starting from closest to the lenses to a scatter shutter farthest from the lenses.

4. The HMD device of claim 1, wherein the controller is to:
   turn the lenses are on when the 3D scene is to be displayed, wherein the 3D scene associated with an augmented reality experience, and
   turn the lenses off when the scatter shutters allow visible light to pass through to the lenses.

5. The HMD device of claim 1, wherein the 3D scene is associated with a virtual reality experience.

6. The HMD device of claim 1, wherein the lenses include a plurality of lens arrays including micro lens arrays, and wherein the lens arrays expand a size of an eye box by generating a plurality of focal stack views for a plurality of different eye positions.

7. The HMD device of claim 1, wherein the controller is to turn the scatter shutters transparent to allow visible light to pass through.

8. The HMD device of claim 1, wherein the frame of the 3D scene is to appear in focus, and to provide a parallax effect.

9. The HMD device of claim 1, wherein the scatter shutters are arranged in a stack.

10. The HMD device of claim 1, wherein a first projector of the at least one projector is mounted to a first side of the HMD device and a second projector of the at least one projector is mounted to a second side of the HMD device opposite the first side.

11. The HMD device of claim 10, wherein the first projector corresponds to a left eye of the user and the second projector corresponds to a right eye of the user.

12. The HMD device of claim 1, wherein the controller is to turn the first one of the scatter shutters opaque prior to the controller turning the second one of the scatter shutters transparent.

13. The HMD device of claim 1, wherein the controller is to turn the first one of the scatter shutters opaque subsequent to the controller turning the second one of the scatter shutters transparent.

14. The HMD device of claim 1, wherein molecules of the film are oriented in a first direction when the first one of the scatter shutters is opaque, the molecules of the film oriented in a second direction when the first one or the scatter shutters is transparent, the second direction different from the first direction.

15. The HMD device of claim 1, wherein the plurality of focal layers correspond to different colors of the frame.

16. A head-mountable display (HMD) device, comprising:
- at least one projector;
- a plurality of scatter shutters, ones of the plurality of scatter shutters associated with a respective focal length;
- lenses to provide a view of a three-dimensional (3D) scene;
- means for requesting or performing a rendering of multiple focus images, wherein the multiple focus images correspond to one or more of the focal lengths, the multiple focus images displayed on respective ones of the scatter shutters for a duration;
- means for adjusting the duration based on a period of a frame rate divided by a number of the scatter shutters minus a transition time, the frame rate corresponding to the 3D scene, the transition time corresponding to a first time to turn a first one of the scatter shutters opaque and a second time to turn a second one of the scatter shutters transparent;
- means for displaying a frame of the 3D scene on the scatter shutters;
- means for selecting, based on eye tracker information, the first one of the scatter shutters corresponding to a projection surface; and
- means for causing the first one of the scatter shutters to turn opaque and the second one of the scatter shutters to turn transparent based on the selection.

17. The HMD device of claim 16, wherein the scatter shutters include transparent organic light emitting diode displays.

18. The HMD device of claim 16, wherein the scatter shutters are arranged in focal length sequence starting from closest to the lenses to a scatter shutter most distant from the lenses.

19. The HMD device of claim 16, wherein the means for causing the first one of the scatter shutters to turn opaque and the second one of the scatter shutters to turn transparent is to turn the lenses on when the 3D scene is to be displayed, wherein the 3D scene is to be associated with an augmented reality experience, and wherein the means for causing is to turn the lenses off when the scatter shutters allow visible light to pass through to the lenses.

20. The HMD device of claim 16, wherein the 3D scene is associated with a virtual reality experience.

21. The HMD device of claim 16, wherein the lenses include lens arrays including micro lens arrays, and wherein the lens arrays are to expand a size of an eye box by generating a plurality of focal stack views for different eye positions.

22. The HMD device of claim 16, wherein the scatter shutters include three or more scatter shutters.

23. The HMD device of claim 16, wherein the frame of the 3D scene is to appear in focus, and to provide a parallax effect.

24. One or more tangible, non-transitory computer readable media for a head-mountable display (HMD) device, comprising a plurality of instructions that, when executed, cause a processor to at least:
- request or perform a rendering of multiple focus images based on eye tracker information relating to a tracking of one or more eyes of a user of the HMD device, the eye tracker information including eye orientation and pupil dilation of the user, wherein the multiple focus images correspond to a plurality of focal lengths associated with each of a plurality of scatter shutters of the HMD device to be used with a plurality of lenses of the HMD device to provide a view of a three-dimensional (3D) scene;
- display, via at least one projector, a frame of the 3D scene on the scatter shutters, the frame viewable at the focal lengths, the frame including a plurality of focal layers relating to the rendering of the multiple focus images, ones of the focal layers generated at respective ones of the focal lengths, the multiple focus images displayed on respective ones of the scatter shutters for a duration;
- adjust the duration based on a period of a frame rate divided by a number of the scatter shutters minus a transition time, the frame rate corresponding to the 3D scene, the transition time corresponding to a first time to turn a first one of the scatter shutters opaque and a second time to turn a second one of the scatter shutters transparent;
- select, based on the eye tracker information, the first one of the scatter shutters corresponding to a projection surface; and
- cause the first one of the scatter shutters to turn opaque and the second one of the scatter shutters to turn transparent based on the selection, the first one of the scatter shutters to turn opaque in response to an alternating current pulse provided through a film of the first one of the scatter shutters.

25. The one or more tangible, non-transitory computer readable media for the head-mountable display (HMD) device of claim 24, wherein the instructions cause the processor to:
- turn the lenses on when the 3D scene is to be displayed, the 3D scene associated with an augmented reality experience; and
- turn the lenses off when the scatter shutters allow visible light to pass through to the lenses.

26. The one or more tangible, non-transitory computer readable media for the head-mounted display (HMD) device of claim 24, wherein the instructions cause the processor to:
- expand a size of an eye box by generating a plurality of focal stack views for a plurality of different eye positions.

27. A method of displaying three-dimensional (3D) scenes via a head-mountable display (HMD) device, the method comprising:
- requesting or performing a rendering of multiple focus images based on eye tracker information relating to a tracking of one or more eyes of a user of the HMD device, the eye tracker information including eye orientation and pupil dilation of the user, wherein the multiple focus images correspond to a plurality of focal lengths associated with respective ones of a plurality of scatter shutters of the HMD device, the scatter shutters to be used with a plurality of lenses of the HMD device to provide a view of a three-dimensional (3D) scene;
- displaying, via at least one projector, a frame of the 3D scene on the scatter shutters, the frame viewable at the focal lengths, the frame including a plurality of focal layers relating to the rendering of the multiple focus images at respective ones of the focal lengths, the multiple focus images displayed on respective ones of the scatter shutters for a duration;
- adjusting the duration based on (a) a frame rate corresponding to the 3D scene and (b) a transition time corresponding to a first time to turn a first one of the scatter shutters opaque and a second time to turn a second one of the scatter shutters transparent, the duration corresponding to a period of the frame rate divided by a number of the scatter shutters minus the transition time;
selecting the first one of the scatter shutters corresponding to a projection surface based on the eye tracker information; and
causing the first one of the scatter shutters to turn opaque and the second one of the scatter shutters to turn transparent based on the selection by providing an alternating current pulse through a film of the first one of the scatter shutters.

28. The method of claim 27, further including:
turning the lenses on when the 3D scene is to be displayed, wherein the 3D scene is to be associated with an augmented reality experience; and
turning the lenses off when the scatter shutters are to allow visible light to pass through to the lenses.

29. The method of claim 27, further including:
expanding a size of an eye box by generating a plurality of focal stack views for a plurality of different eye positions.

\* \* \* \* \*